Patented Jan. 25, 1944

2,340,177

UNITED STATES PATENT OFFICE 2,340,177

MANUFACTURE OF CELLULOSE ETHERS

Henry Dreyfus, London, England, assignor to Celanese Corporation of America, a corporation of Delaware No Drawing. Application September 11, 1941, Serial No. 410,465. In Great Britain September 3, 1940

8 Claims. (Cl. 260—231)

This invention is concerned with improvements in or relating to the manufacture of cellulose ethers.

The production of cellulose ethers is usually carried out by treating cellulose with sodium hydroxide so as to form a soda cellulose and then heating the soda cellulose with the etherifying agent, which is usually an organic halide or sulphate, for example methyl or ethyl chloride or dimethyl or diethyl sulphate. The production of the soda cellulose may, for example, be effected by impregnating the cellulose with an aqueous solution of sodium hydroxide and then pressing out excess solution until a product having about 3 to 4 times the weight of the original cellulose is obtained. The use of an aqueous sodium hydroxide solution having the optimum mercerising concentration, i. e., about 18–20% of sodium hydroxide, has frequently been described, as has also the use of sodium hydroxide solutions of lower and higher concentrations, for example, 5% to 50%.

The present invention renders it possible to obtain cellulose ethers, particularly cellulose ethers which contain a high proportion of ether radicles, for example 2 or 2.5 radicles per $C_6H_{10}O_5$ unit, and which are soluble in organic solvents, with the use of proportions of sodium hydroxide or other alkali and of etherifying agent which do not substantially exceed those theoretically required. According to the invention, cellulose is impregnated, for example at atmospheric temperature, with an aqueous solution of sodium hydroxide or other caustic alkali which is substantially saturated at the temperature employed and further quantities of alkali are incorporated in one or more stages, the temperature at each stage being raised sufficiently to bring the additional alkali into solution. The incorporation of alkali may be effected prior to the etherification process but preferably it is added in stages during etherification.

The most important alkali for use in the present process is sodium hydroxide and the invention will be described with particular reference thereto, though it is to be understood that the process may also be carried out using other alkalis, for example potassium hydroxide. The process is particularly applicable to the production of lower alkyl ethers of cellulose, for example the methyl, ethyl, propyl or butyl ether, using for example the corresponding alkyl chloride, dialkyl sulphate or sodium alkyl sulphate as etherifying agent, but it is also applicable to the production of other cellulose ethers, for example the benzyl ether.

The process may for example be carried out by impregnating one molecular equivalent of cellulose, calculated on the $C_6H_{10}O_5$ unit, with a 50% aqueous solution of sodium hydroxide containing about 4 molecular equivalents of sodium hydroxide by mixing the reagents thoroughly in a Werner-Pfleiderer mixer, then introducing 1–2 molecular equivalents of etherifying agent, for example diethyl sulphate, keeping the temperature at about 35–55° C., next incorporating a further quantity of sodium hydroxide in powder form and raising the temperature to, for example, 70 or 80° C. so as to bring the sodium hydroxide into solution, incorporating a further quantity of etherifying agent, for example 2 or 3 molecular equivalents, and then more sodium hydroxide, the temperature being again raised, for example to 90 or 100° C. so as to bring the sodium hydroxide into solution. Etherification may then be continued, for example for a further 1 or 2 hours, till the required degree of etherification has been effected and the cellulose ether may then be separated and purified in any suitable manner. Preferably the reaction is carried out in the presence of an inert diluent, for example benzene, toluene, xylene or other aromatic hydrocarbon.

Instead of incorporating sodium hydroxide as such during the reaction so as to increase the concentration of the sodium hydroxide solution present, it may be incorporated indirectly, e. g., by introducing metallic sodium into the reaction mixture where it reacts with the water present to form sodium hydroxide. Further, when benzene or other inert diluent is employed uniform and rapid etherification of the cellulose is facilitated by the use of an etherifying agent which is soluble in the diluent. Salts of ethyl and other alkyl sulphuric acids with organic bases of high molecular weight, for example diethyl cyclohexylamine or tricyclohexylamine, are examples of such etherifying agents. The use of such etherifying agents is of value not only when the formation of the alkali cellulose is effected according to the process of the present invention, but in general in processes in which cellulose ethers are produced by reacting alkali cellulose with etherifying agents in the presence of inert diluents.

The uniformity and rapidity of the reaction are also improved by the use of a diluent which is a solvent for the ether produced.

The following example is given in order to illustrate the invention:

162 parts of cellulose are immersed in a 50% aqueous solution of sodium hydroxide until they are thoroughly impregnated with the solution.

They are then removed and the liquid expressed until they contain about 250 parts of solution. They are then introduced into 1,000 parts of toluene containing 500 parts of diethyl sulphate and about 60 parts sodium hydroxide and the mixture is thoroughly agitated for two to three hours at 50 to 60° C. in a closed vessel. A further 200 parts sodium hydroxide are then introduced into the vessel through a trap and the mixture agitated for two to three hours at a temperature of 100 to 110° C. It is then allowed to cool and the cellulose ether produced is separated, purified, and dried.

Having described my invention, what I desire to secure by Letters Patent is:

1. Process for the production of cellulose ethers, which comprises impregnating cellulose at atmospheric temperature with a substantially saturated solution of a caustic alkali, reacting the impregnated cellulose with a lower alkyl etherifying agent in amount less than is chemically equivalent to the final product desired, adding to the etherification mixture solid caustic alkali and a further quantity of the same etherifying agent, raising the temperature until all of the caustic alkali is in solution and continuing with the etherification until the desired product is obtained, the solid caustic alkali and the further quantity of the etherifying agent being added to the etherifying mixture under such conditions that no water is added to said etherifying mixture.

2. Process for the production of cellulose ethers, which comprises impregnating cellulose at atmospheric temperature with a substantially saturated solution of a caustic alkali, reacting the impregnated cellulose in a medium comprising an inert diluent with a lower alkyl etherifying agent in amount less than is chemically equivalent to the final product desired, adding to the etherification mixture solid caustic alkali and a further quantity of the same etherifying agent, raising the temperature until all of the caustic alkali is in solution and continuing with the etherification until the desired product is obtained, the solid caustic alkali and the further quantity of the etherifying agent being added to the etherifying mixture under such conditions that no water is added to said etherifying mixture.

3. Process for the production of cellulose ethers, which comprises impregnating cellulose at atmospheric temperature with a substantially saturated solution of sodium hydroxide, reacting the impregnated cellulose with a lower alkyl etherifying agent in amount less than is chemically equivalent to the final product desired, adding to the etherification mixture solid sodium hydroxide and a further quantity of the same etherifying agent, raising the temperature until all of the sodium hydroxide is in solution and continuing with the etherification until the desired product is obtained, the solid sodium hydroxide and the further quantity of the etherifying agent being added to the etherifying mixture under such conditions that no water is added to said etherifying mixture.

4. Process for the production of cellulose ethers, which comprises impregnating cellulose at atmospheric temperature with a substantially saturated solution of sodium hydroxide, reacting the impregnated cellulose with an ethylating agent in amount less than is chemically equivalent to the final product desired, adding to the etherification mixture solid sodium hydroxide and a further quantity of the same ethylating agent, raising the temperature until all of the sodium hydroxide is in solution and continuing with the etherification until the desired product is obtained, the solid sodium hydroxide and the further quantity of the ethylating agent being added to the etherifying mixture under such conditions that no water is added to said etherifying mixture.

5. Process for the production of cellulose ethers, which comprises impregnating cellulose at atmospheric temperature with a substantially saturated solution of a caustic alkali, reacting the impregnated cellulose in a medium comprising an inert diluent, which is a solvent for the etherifying agent, with a lower alkyl etherifying agent in amount less than is chemically equivalent to the final product desired, adding to the etherification mixture solid caustic alkali and a further quantity of the same etherifying agent, raising the temperature until all of the caustic alkali is in solution and continuing with the etherification until the desired product is obtained, the solid caustic alkali and the further quantity of the etherifying agent being added to the etherifying mixture under such conditions that no water is added to said etherifying mixture.

6. Process for the production of cellulose ethers, which comprises impregnating cellulose at atmospheric temperature with a substantially saturated solution of a caustic alkali, reacting the impregnated cellulose in a medium comprising an inert diluent, which is a solvent both for the etherifying agent and for the ether produced, with a lower alkyl etherifying agent in amount less than is chemically equivalent to the final product desired, adding to the etherification mixture solid caustic alkali and a further quantity of the same etherifying agent, raising the temperature until all of the caustic alkali is in solution and continuing with the etherification until the desired product is obtained, the solid caustic alkali and the further quantity of the etherifying agent being added to the etherifying mixture under such conditions that no water is added to said etherifying mixture.

7. Process for the production of cellulose ethers, which comprises impregnating cellulose at atmospheric temperature with a substantially saturated solution of a caustic alkali, reacting the impregnated cellulose with an etherifying agent, which is an alkyl sulphuric acid salt of an amine of high boiling point in amount less than is chemically equivalent to the final product desired, adding to the etherification mixture solid caustic alkali and a further quantity of the same etherifying agent, and continuing with the etherification at a temperature at least high enough to cause all of the caustic alkali to dissolve.

8. Process for the production of cellulose ethers, which comprises impregnating cellulose at atmospheric temperature with a substantially saturated solution of a caustic alkali, reacting the impregnated cellulose with an alkyl sulphuric acid salt of an amine of high boiling point in a medium comprising an inert organic liquid which is a solvent for the etherifying agent.

HENRY DREYFUS.